United States Patent
Kalavsky

(10) Patent No.: US 11,881,756 B2
(45) Date of Patent: Jan. 23, 2024

(54) ROTOR WITH INTEGRATED FAN, ELECTRIC MOTOR, PUMP DEVICE, HOUSEHOLD APPLIANCE AND PRODUCTION METHOD

(71) Applicant: BSH Hausgeraete GmbH, Munich (DE)

(72) Inventor: Michal Kalavsky, Kosice (SK)

(73) Assignee: BSH Hausgeraete GmbH, Munich (DE)

(*) Notice: Subject to any disclaimer, the term of this patent is extended or adjusted under 35 U.S.C. 154(b) by 43 days.

(21) Appl. No.: 17/537,945

(22) Filed: Nov. 30, 2021

(65) Prior Publication Data

US 2022/0173636 A1 Jun. 2, 2022

(30) Foreign Application Priority Data

Dec. 2, 2020 (DE) ...................... 10 2020 215 183.0

(51) Int. Cl.
| | |
|---|---|
| *H02K 9/06* | (2006.01) |
| *H02K 1/2733* | (2022.01) |
| *H02K 1/30* | (2006.01) |
| *F04D 19/00* | (2006.01) |
| *F04D 25/06* | (2006.01) |
| *F04D 29/18* | (2006.01) |

(52) U.S. Cl.
CPC ............. *H02K 9/06* (2013.01); *F04D 19/002* (2013.01); *F04D 25/06* (2013.01); *F04D 29/181* (2013.01); *H02K 1/2733* (2013.01); *H02K 1/30* (2013.01)

(58) Field of Classification Search
CPC .......... H02K 9/06; H02K 1/2733; H02K 1/30; H02K 1/2787; H02K 1/32; H02K 7/14; H02K 1/2786; H02K 15/03; H02K 1/27; H02K 21/22; F04D 19/002; F04D 25/06; F04D 29/181

USPC ...................................... 310/89, 156.26, 400
See application file for complete search history.

(56) References Cited

U.S. PATENT DOCUMENTS

| | | | |
|---|---|---|---|
| 2013/0154415 A1* | 6/2013 | Origlia | H02K 1/30 310/89 |
| 2017/0054334 A1* | 2/2017 | Binder | H02K 1/12 |
| 2018/0108377 A1* | 4/2018 | Shiraishi | H02K 1/30 |

(Continued)

FOREIGN PATENT DOCUMENTS

| | | |
|---|---|---|
| DE | 19513134 A1 | 10/1996 |
| FR | 2710371 A1 | 3/1995 |

OTHER PUBLICATIONS

DE 19513134 A1 (Year: 1996).*
FR 2710371 A1 (Year: 1995).*
JP H0965614 A (Year: 1997).*

*Primary Examiner* — Jose A Gonzalez Quinones
(74) *Attorney, Agent, or Firm* — Laurence A. Greenberg; Werner H. Stemer; Ralph E. Locher

(57) ABSTRACT

A rotor for an electric motor includes a ring portion and a hub portion. The ring portion contains a permanent magnet material and is configured to at least partially rotate about at least a portion of a stator of the electric motor. The hub portion is configured as a fan including two or more blade elements each being connected to the ring portion. The blade elements encompass two or more axial air passages. An electric motor including the rotor, a pump device and a household appliance each including the electric motor, as well as a method of producing the rotor, are also provided.

9 Claims, 3 Drawing Sheets

(56) References Cited

U.S. PATENT DOCUMENTS

2018/0219446 A1\* 8/2018 Yamada ............... H02K 1/2786
2020/0177056 A1\* 6/2020 Nakamura ............... H02K 9/06

\* cited by examiner

ROTOR WITH INTEGRATED FAN, ELECTRIC MOTOR, PUMP DEVICE, HOUSEHOLD APPLIANCE AND PRODUCTION METHOD

CROSS-REFERENCE TO RELATED APPLICATION

This application claims the priority, under 35 U.S.C. § 119, of German Patent Application DE 10 2020 215 183.0, filed Dec. 2, 2020; the prior application is herewith incorporated by reference in its entirety.

FIELD AND BACKGROUND OF THE INVENTION

The present invention relates to a rotor for an electric motor, an electric motor including the rotor, a pump device and a household appliance each including the electric motor. The present invention also relates to a method of producing the rotor.

Electric household appliances often include an electric motor which, in particular, may be configured to drive a rotatable tool or an impeller of a pump. Different types of rotors included in the corresponding electric motors are known.

SUMMARY OF THE INVENTION

It is accordingly an object of the invention to provide an improved permanent magnet rotor of a household appliance with an integrated fan, an electric motor, a pump device, a household appliance and a method of producing the rotor, which overcome the hereinafore-mentioned disadvantages of the heretofore-known rotors, motors, pump devices, appliances and methods of this general type. Preferred embodiments are disclosed in the dependent claims, the description, and the figures.

With the foregoing and other objects in view there is provided, in accordance with the invention, a rotor configured to form part of an electric motor. The rotor includes a ring portion and a hub portion. The ring portion contains a permanent magnet material; in particular, the rotor is a permanent magnet rotor. The ring portion is configured to at least partially (i.e., at least with a portion thereof) rotate about at least a portion of a stator of the electric motor. That is, when the rotor is mounted in the electric motor, at least a portion of the rotor is positioned radially outwardly of at least a portion of the stator. As is to be understood, in this document, the term "radial" as well as the terms "axial" and "circumferential" each refer to a designated axis of rotation of the rotor, and the same holds for their respective linguistic derivatives.

The hub portion of a rotor according to the present invention is configured as a fan: It includes two or more (preferably at least three or at least four) blade elements each being connected (preferably at their respective radially outer ends) to the ring portion, wherein the blade elements encompass two or more air passages extending in axial direction.

Due to the axial air passages provided between the blade elements of the hub portion, the present invention facilitates, in an integrated manner, an air flow in axial direction through the rotor and the stator portion surrounded by the rotor. Thereby, an improved cooling of components of the electric motor, in particular of stator windings, at least one stator stack and/or one or more bearing elements rotatably supporting the rotor is facilitated, which cooling increases durability of the electric motor. For instance, degradation of components (such as stator windings, a stator slot insulation, a bearing system and/or a lubrication thereof) of the electric motor can be at least slowed down.

In particular, as compared to conventional electric motors, utilization of active parts of the electric motor can be increased without causing a temperature rise in operation of the electric motor. Therefore, the electric motor can be manufactured with less outer dimensions and/or using less active materials (such as magnet material, copper and/or ferrous material), while nevertheless the performance can be maintained.

In addition, as compared to a conventional rotor with a plain, continuous hub portion, the air passages provided in the hub portion facilitate a saving of material and, thereby, a reduction of mass of the rotor.

According to preferred embodiments, the rotor is included or configured to be included in a household appliance, for example in a household appliance including a pump device.

The blade elements may extend in radial direction directly or with a bent shape. The rotor may further include a shaft. Such a shaft may be rotationally fixed to the hub portion (i.e., connected to the hub portion for co-rotation).

According to advantageous embodiments, the rotor includes a monolithic part including the ring portion and the hub portion. That is, the ring portion and the hub portion of the rotor each may be integrated in a common monolithic part. Thereby, an increased stability and durability of the rotor can be achieved. In particular, such a monolithic part may be produced by injection molding and/or by additive manufacturing.

At least a portion of the rotor, preferably the ring portion and/or the hub portion thereof, may at least partially be made of a plastic material. Therefore, the rotor can be particularly lightweight. In particular, the rotor is advantageously at least partially made of a plastomagnet material. Preferably, the hub portion and the ring portion are both at least partially made of the same (common) plastic material.

In embodiments in which the rotor includes a monolithic part including the ring portion and the hub portion, as mentioned above, in particular such a monolithic part may be made of a plastic (plastomagnet) material.

According to preferred embodiments, at least one of the blade elements has at least one section with a thinning margin in which the blade element thins (measured in axial direction) towards an edge delimiting the at least one blade in circumferential direction. Such a thinning margin in particular may be chamfered and/or rounded. Preferably, the at least one blade element has two such sections with thinning margins which are opposed to each other in circumferential direction. In particular, at least one of the blades may have a streamlined shape in circumference direction.

These embodiments provide for an improved air flow which is generated by the hub portion configured as a fan, when the rotor is rotated.

The hub portion may advantageously be non-magnetic.

The ring portion may be magnetized irregularly. In particular, the ring portion may include a (preferably annular) first sub-portion and a (preferably annular) second sub-portion, wherein the ring portion may have a weaker magnetic field in the second sub-portion than in the first sub-portion. In particular, the second sub-portion may be non-magnetic, and/or the ring portion (or even the rotor (as a whole)) may be anisotropic only in the first sub-portion of the ring portion.

Thereby, a consumption of permanent magnet material in a production process of the rotor may be reduced. In particular, an inclusion of permanent magnet material in an ineffective sub-portion of the rotor can be avoided.

The second sub-section of the ring portion may separate the first sub-section from the hub portion, in particular in axial direction. That is, the second sub-section may be disposed between the first sub-section and the hub portion (in particular in axial direction). For instance, a dimension of the first sub-portion in axial direction may be smaller than a dimension of the (total) ring portion in axial direction. These embodiments provide for a reduced (or even obviated) occurrence of axial force between the rotor and the stator, in particular a stator stack thereof, when the electric motor is operated. In particular, friction losses resulting from such an axial force can be reduced or even inhibited.

According to advantageous embodiments, a radially outer surface of the ring portion narrows towards the hub portion. Thereby, material needed for a production of the rotor can be saved, and the rotor can have a particularly low mass. In particular, in embodiments including a first and a second sub-portion with different magnetic fields as mentioned above, the first sub-portion may have a greater diameter (respectively measured in radial direction) than the second sub-portion.

With respect to an axial direction, the ring portion (in particular, in respective embodiments, the first sub-portion thereof) may preferably have a skewed direction of magnetization. A corresponding angle between the direction of magnetization and a parallel to the designated axis of rotation of the rotor may preferably be larger than 5°, than 10° or than 15°, and/or smaller than 40°, than 35° or than 30°. Thereby, a reduced motor cogging torque can be achieved.

With the objects of the invention in view, there is also provided a method for producing a rotor according to an embodiment of the present invention. The method includes manufacturing at least the ring portion and/or the hub portion of the rotor by injection molding and/or by additive manufacturing.

Thereby, a fast and nevertheless reliable production can be ensured.

With the objects of the invention in view, there is furthermore provided an electric motor which includes a stator and a rotor according to an embodiment of the present invention. At least a portion of the stator is disposed so as to be encompassed by (at least a portion of) the rotor's ring portion.

With the objects of the invention in view, there is additionally provided a pump device which includes an impeller and an electric motor according to an embodiment of the present invention. Therein, the impeller is configured to be driven by the electric motor. The pump device may be a wet or a dry pump device. In particular, it may be configured to pump liquid (such as water) or gas (such as air).

With the objects of the invention in view, there is concomitantly provided a household appliance which includes an electric motor according to an embodiment of the present invention. In particular, the household appliance may include an electric pump according to an embodiment of the present invention. The household appliance may, for instance, be a washing machine, a dishwasher, a laundry dryer, a kitchen hood or a ventilator.

Other features which are considered as characteristic for the invention are set forth in the appended claims.

Although the invention is illustrated and described herein as embodied in a rotor with an integrated fan, an electric motor, a pump device, a household appliance and a production method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

In the following, preferred embodiments of the present invention are explained with respect to the accompanying drawings. As is to be understood, the various elements and components are depicted as examples only, and may be facultative and/or combined in a manner different than that depicted. Reference signs for related elements are used comprehensively and not defined again for each figure.

DETAILED DESCRIPTION OF THE INVENTION

Figure 1:
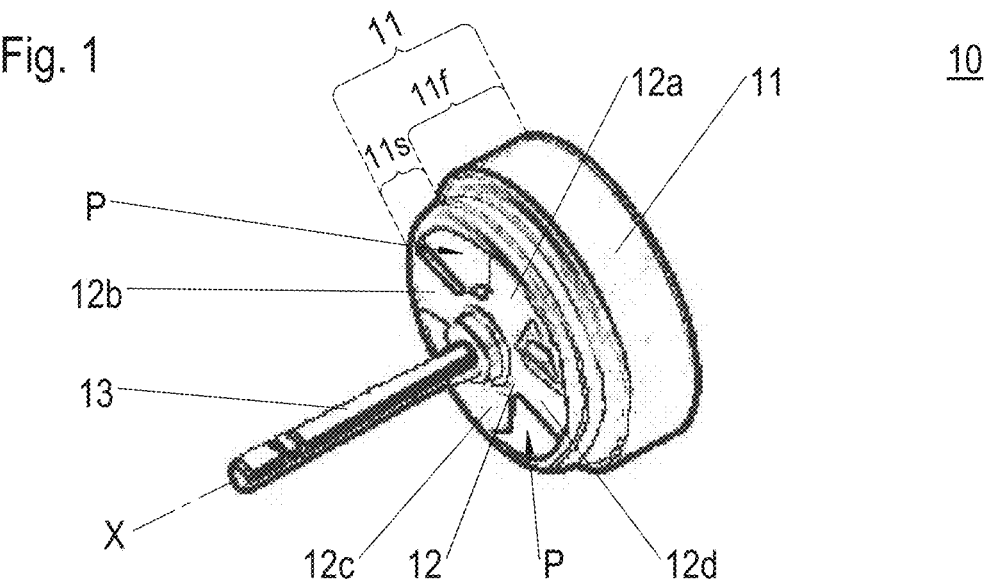
FIG. 1 is a diagrammatic, perspective view of a rotor according to an exemplary embodiment of the present invention.

Referring now to the figures of the drawings in detail and first, particularly, to FIG. 1 thereof, there is seen an exemplary embodiment of a rotor 10 according to the present invention.

Figure 3:
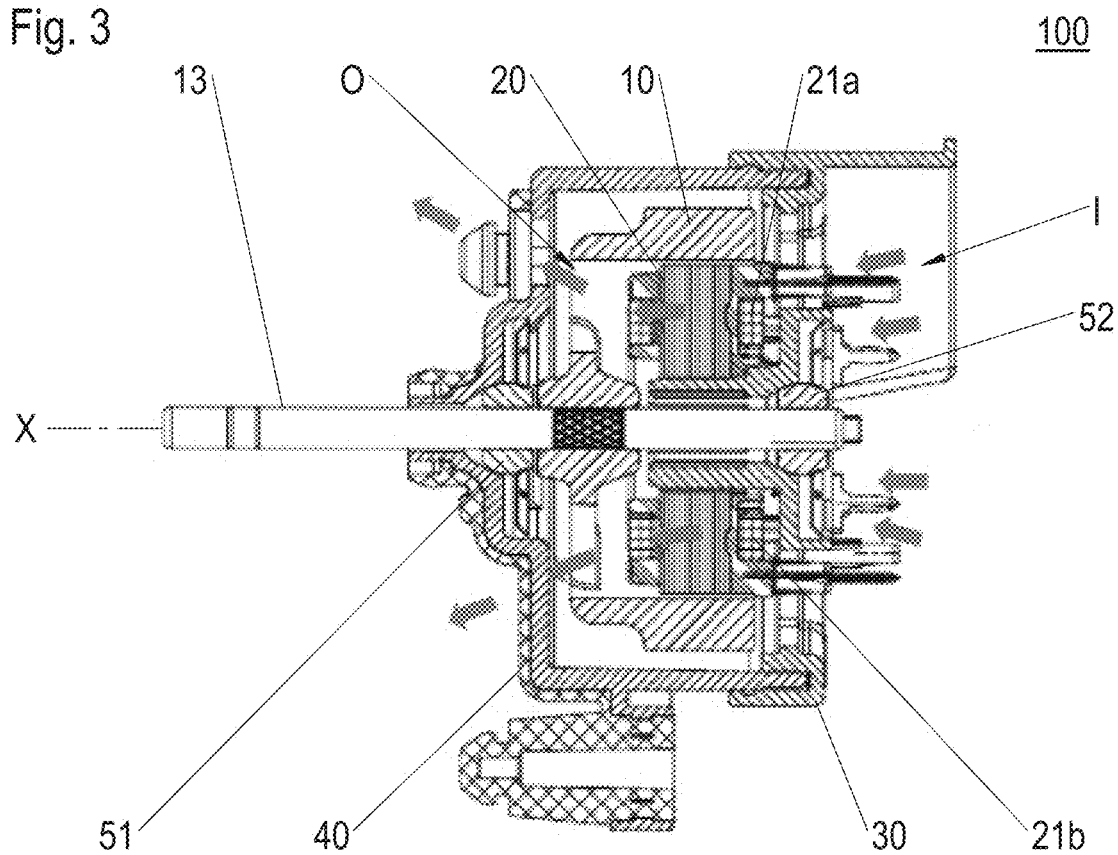
FIG. 3 is a cross-sectional view of an electric motor according to an embodiment of the present invention along with an air flow.

The rotor 10 includes a ring portion 11, a hub portion 12 and a shaft 13. The ring portion 11 is configured to at least partially rotate, (i.e., to rotate with at least a portion thereof), about at least a portion of a stator of an electric motor, such as about a stator 20 as depicted in FIG. 3. In particular, the rotor 10 may be included in an electric motor included in a (dry or wet) pump device.

In the embodiment depicted, the ring portion 11 and the hub portion 12 are integrated in a common monolithic part. Thereby, the rotor 10 can be made particularly solid.

As is seen in FIG. 1, the hub portion 12 is configured as a fan: In the exemplary case depicted, it includes (exactly) four blade elements 12a, 12b, 12c, 12d which each extend in radial direction (with respect to the designated rotation axis X of the rotor 10) and which at their respective radially outer end are connected to the ring portion 11. An axial air passage P is provided between each two blade elements which are adjacent each other in circumferential direction.

Accordingly, in operation of an electric motor including the rotor 10, an air flow is effected through an inner region surrounded by the ring portion 11 and—thereafter—through the air passages P. The air flow serves to cool down elements of the electric motor. Additionally, the air passages provide for a reduced mass of the rotor.

Preferably, at least the ring portion 11 and/or the hub portion 12 of the rotor 10 are made of plastic material, in particular of a plastomagnet material. The manufacturing may be realized by injection molding and/or additive manufacturing.

In the embodiment depicted, the ring portion 11 includes a first sub-portion 11*f* and a second sub-portion 11*s*. In axial direction (i.e., parallel to the designated rotation axis X), the second sub-portion 11*s* is disposed between the hub portion 12 and the first sub-portion 11*f*, thus separating them in axial direction. Therefore, the second sub-portion 11*s* connects the first sub-portion 11*f* (of the ring portion) with the hub portion 12. In the embodiment depicted, the first and the second sub-portions both have an annular shape.

At least the first sub-portion 11*f*, which is configured to at least partially rotate about the stator (not shown in FIG. 1), contains a permanent magnet material (not visible in FIG. 1). Therefore, the magnetic field is weaker in the second sub-portion 11*s* than in the first sub-portion 11*f*. Thereby, magnet material can be saved.

For example, the second sub-portion 11*s* may be non-magnetic (magnet-free), so that only the first sub-portion 11*f* of the ring portion has a magnetic field. In particular, the first sub-portion 11*f* may be anisotropic and the second sub-portion 11*s* may be isotropic.

Thereby, in operation of the electric motor including the rotor 10, an axial force between the rotor 10 and the stator stack can be reduced or even prevented, which minimizes friction losses.

Figure 2A:
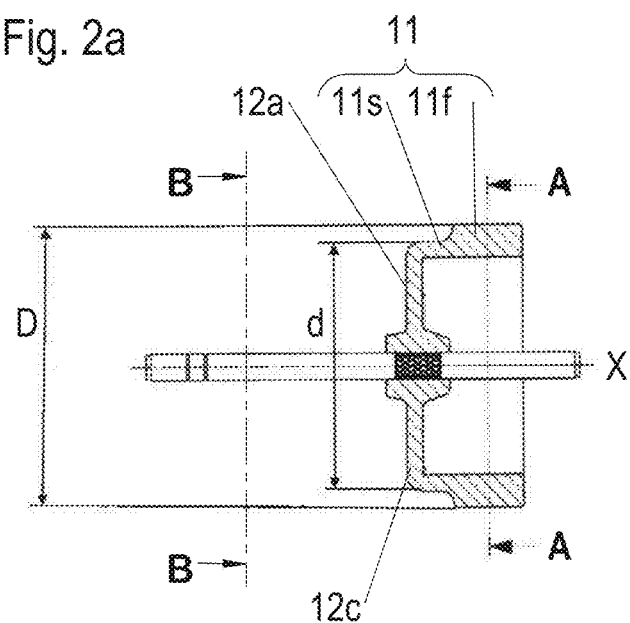
FIGS. 2A-2D are different cross-sectional views of an exemplary rotor according to the present invention.

As illustrated in FIG. 2A (showing the rotor 10 in cross section taken along the designated rotation axis X) the second sub-portion 11*s* has diameter d (measured in radial direction with respect to the designated rotation axis X) which is smaller than a diameter D (likewise measured in radial direction with respect to the axis X) of the first sub-portion 11*f*. In particular, the radially outer surface of the ring portion 11 narrows towards the hub portion 12.

Figure 2B:
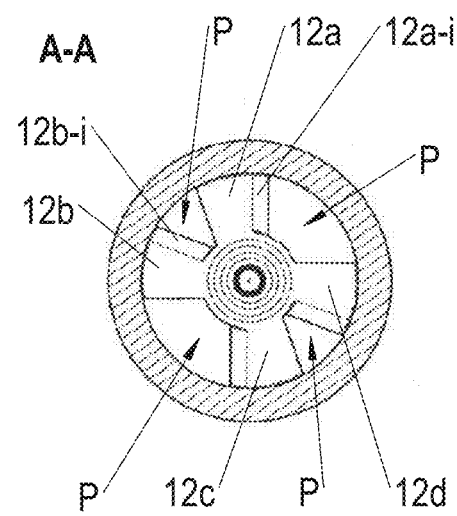
Figure 2C:
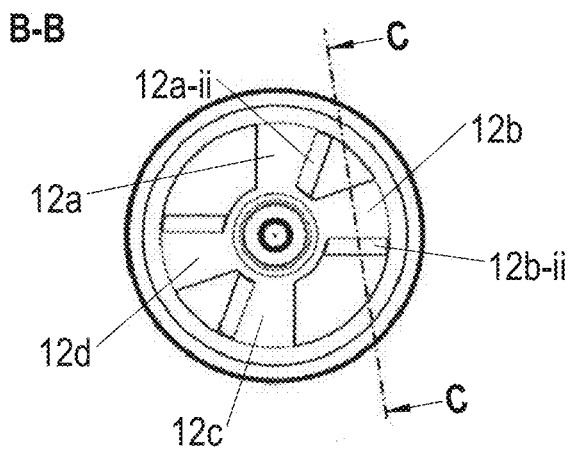
Figure 2D:
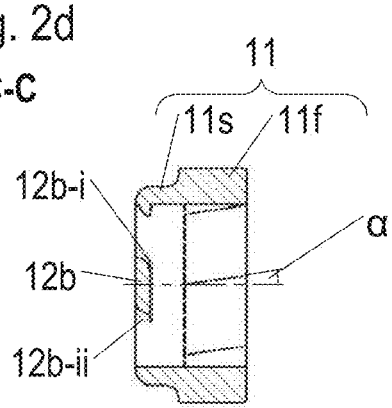

FIGS. 2B and 2C each show a respective cross section taken orthogonally to the rotation axis X, as indicated in FIG. 2A by respective section lines A-A and B-B, wherein the viewing direction in both figures is towards the hub portion 12 of the rotor 10. In FIG. 2D, a cross section parallel to the rotation axis X is shown, as indicated (in FIG. 2C), by a section line C-C.

As is seen in FIGS. 2B-2D, each two blade elements 12*a*, 12*b*, 12*c*, 12*d*, which are adjacent in circumferential direction, are separated by a respective air passage P. The blade elements 12*a*, 12*b*, 12*c*, 12*d* each thin at their edges, towards the air passages P.

In order to improve clarity of the drawings, only thinning margins 12*a-i*, 12-*a-ii* of the blade element 12*a* and thinning margins 12*b-i* and 12*b-ii* of the blade element 12*b* are indicated, although it is to be understood that the blade elements 12*c* and 12*d* are shaped alike.

Therefore, as can be seen in FIGS. 2B-2D, the blade elements 12*a*, 12*b* each thin towards opposite directions at their edges which are opposite to each other in circumferential direction. That is, the thinning margins 12*a-i*, 12*a-ii* at the opposite edges of the blade element 12*a* face in opposite directions (parallel to the rotation axis X), in such a way that the thinning margins are identifiable from different sides. The same holds for the thinning margins at the opposite edges of the other blade elements.

Indeed, in FIG. 2B having a viewing direction from a space surrounded by the ring portion 11 towards the hub portion 12, only the thinning margins 12*a-i*, 12*b-i* are visible. By contrast, in FIG. 2C having a reverse viewing direction, the thinning margins 12*a-ii*, 12*b-ii* can be discerned.

As is in particular seen in FIG. 2D, the blade element 12*b* has a cross section which has a rotational symmetry of order two.

As further shown in FIG. 2D, the thinning margins 12*b-i*, 12*b-ii* of the blade 12*b* of the exemplary embodiment depicted (and likewise of the other blade elements) are rounded. According to alternative embodiments, the edges of the blade elements may include a chamfered section; in particular, the thinning margins may be flat.

According to preferred embodiments, the ring portion, in particular the first sub-section 11*f* thereof, has a direction of magnetization which is skewed with respect to the designated rotation axis X. In FIG. 2D, a corresponding skew angle α between the direction of magnetization and a line parallel to the rotation axis X is indicated. Preferably, such an angle α is larger than 5°, than 10° or than 15°, and/or smaller than 40°, than 35° or than 30°. Thereby, a reduced motor cogging torque can be achieved.

In FIG. 3, the rotor 10 is shown as being included in an electric motor 100 according to an exemplary embodiment of the present invention. The electric motor 100 is depicted in cross section along the dedicated rotation axis X of the rotor 10.

In addition to the rotor 10, the electric motor 100 includes a stator 20 including stator windings. In the cross section of FIG. 3, stator windings 21*a*, 21*b* are visible. The stator is held by a first housing component 30, which is connected to a second housing component 40 encompassing the ring portion 11 and the hub portion 12 of the rotor 10 as well as the stator windings. A shaft 13 is rotatably mounted in the combined first and second housing components 30, 40 by using bearing elements 51, 52.

Air inlets I are provided in the first housing component 30, and air outlets O are provided in the second housing component 40. Due to the hub portion 12 of the rotor 10 according to the present invention being configured as a fan, a cooling air flow is thereby facilitated, as indicated in FIG. 3 by arrows: Air entering the electric motor 100 through the air inlets I can thus cool inner components of the electric motor (such as the stator windings and/or the bearing elements 51, 52). Therefore, the air can be heated by those components and exit the electric motor through the air outlets O.

Figure 4:
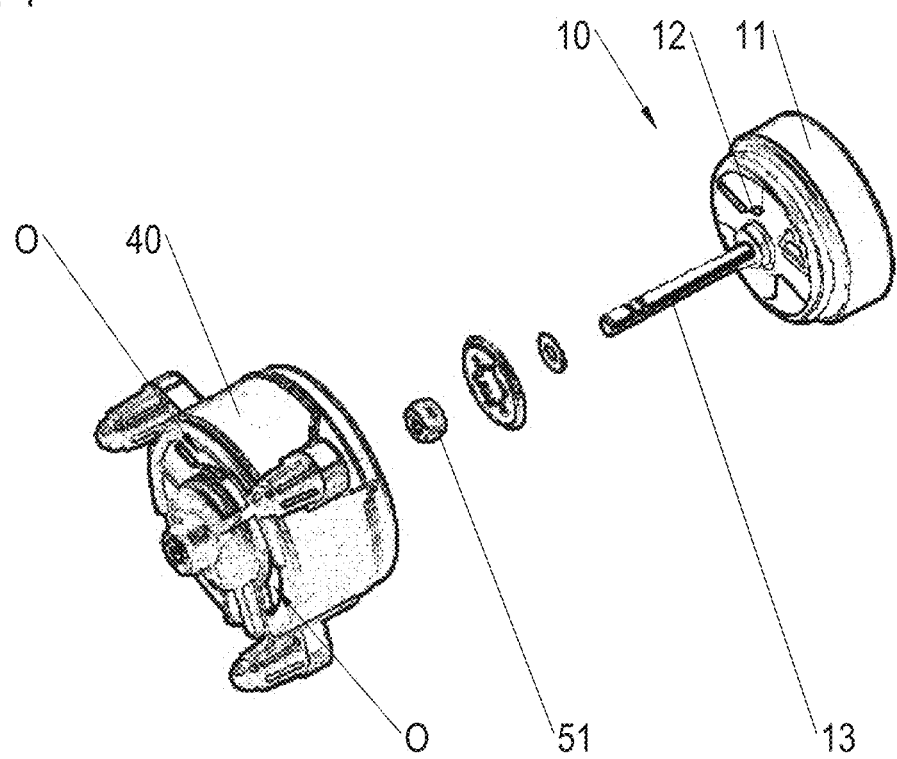
FIG. 4 is an exploded, perspective view of components of an electric motor according to an embodiment of the present invention.

In FIG. 4, an exploded view illustrates how the rotor 10 is mounted in the second housing component 40 of the electric motor 100 shown in FIG. 3. A perspective view, particularly of the second housing component 40 is thereby provided, in particular.

Figure 5:
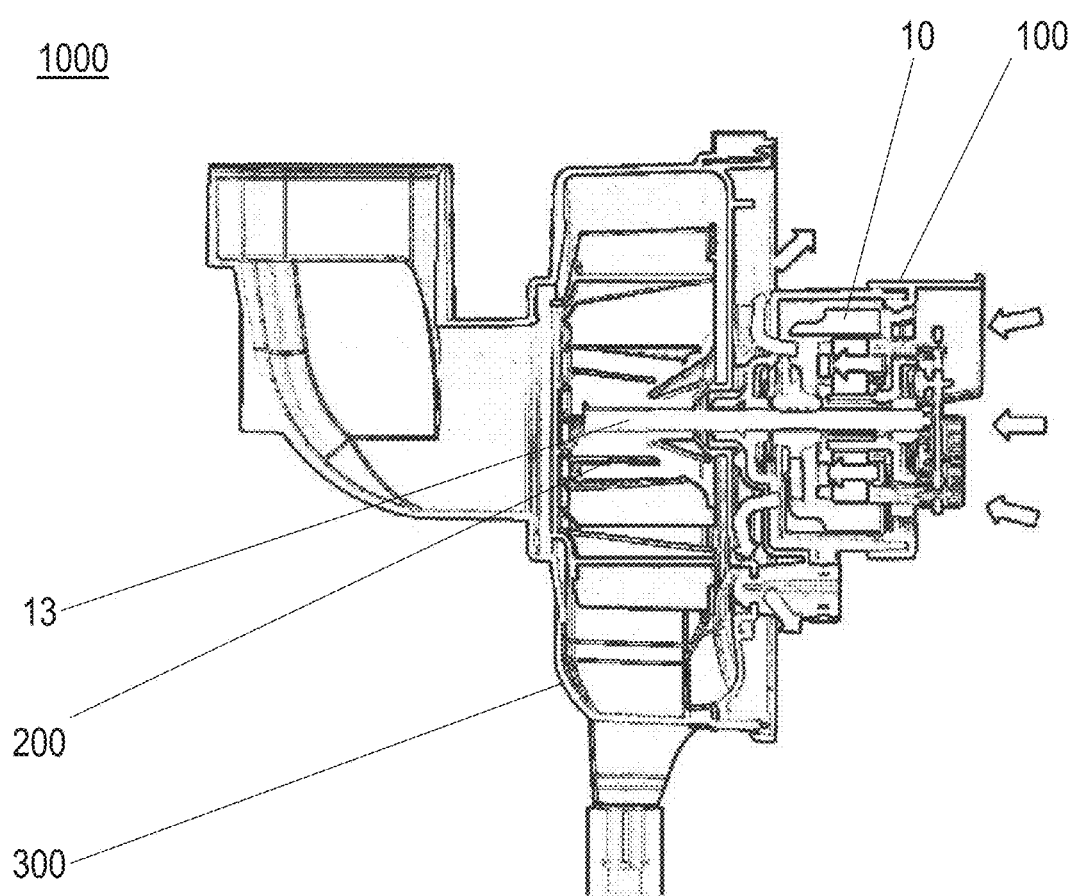
FIG. 5 is a cross-sectional view of a pump assembly according to the present invention with a cooling air flow.

FIG. 5 depicts a pump 1000 according to an embodiment of the present invention. In particular, such a pump may be included in a household appliance such as a washing machine, a tumble dryer or a dishwasher.

The pump 1000 includes an electric motor 100 according to the present invention. The shaft 13 of the rotor 10 of the electric motor 100 is connected to an impeller 200 of the pump 1000 and thereby configured to drive the impeller 200 within a pump housing 300.

Arrows in FIG. 5 illustrate the cooling air flow through the electric motor 100, as facilitated by the present invention.

A rotor 10 for an electric motor 100 is therefore disclosed. The rotor includes a ring portion 11 and a hub portion 12, wherein the ring portion 11 contains a permanent magnet material and is configured to at least partially rotate about at least a portion of a stator 20 of the electric motor 100. The hub portion 12 is configured as a fan including two or more blade elements 12a, 12b, 12c, 12d each being connected to the ring portion 11, the blade elements encompassing two or more axial air passages P.

Further disclosed are an electric motor 100 including such a rotor 10, a pump device 1000 and a household appliance each including such an electric motor 100, and a method of producing the rotor 10.

The following is a summary list of reference numerals and the corresponding structure used in the above description of the invention:

- 10 rotor
- 11 ring portion
- 11f first sub-portion
- 11s second sub-portion
- 12 hub portion
- 12a, 12b, 12c, 12d blade element
- 12a-i, 12a-ii, 12b-i, 12b-ii thinning margin
- 13 shaft
- 20 stator
- 21a, 21b stator winding
- 30 first housing component
- 40 second housing component
- 51, 52 bearing elements
- 100 electric motor
- 200 impeller
- 300 pump housing
- 1000 pump
- α skewing angle
- d diameter of second sub-portion 11s
- D diameter of first sub-portion 11f
- I air inlet
- O air outlet
- P air passage
- X designated rotation axis

The invention claimed is:

1. A rotor for an electric motor, the rotor comprising:
   a ring portion and a hub portion;
   said ring portion containing a permanent magnet material, said ring portion being configured to at least partially rotate about at least a portion of a stator of the electric motor, said ring portion including a first sub-portion and a second sub-portion, and said ring portion having a weaker magnetic field in said second sub-portion than in said first sub-portion; and
   said hub portion being configured as a fan including two or more blade elements each being connected to said ring portion, said blade elements encompassing two or more axial air passages;
   at least one of said ring portion or said hub portion being made of a plastomagnetic material.

2. The rotor according to claim 1, wherein at least one of said blade elements has at least one section with a thinning margin, said at least one blade element thinning in said thinning margin towards an edge delimiting said at least one blade in circumferential direction.

3. The rotor according to claim 1, wherein said second sub-portion separates said first sub-portion from said hub portion in axial direction.

4. The rotor according to claim 1, wherein said ring portion has a radially outer surface narrowing towards said hub portion.

5. An electric motor, comprising a rotor according to claim 1 and a stator.

6. A pump device, comprising an impeller and an electric motor according to claim 5.

7. A household appliance, comprising an electric motor according to claim 5.

8. A household appliance, comprising a pump device according to claim 6.

9. A method of producing a rotor according to claim 1, the method comprising manufacturing at least one of said ring portion or said hub portion by at least one of injection molding or additive manufacturing.

\* \* \* \* \*